July 24, 1962  J. H. BOOTH ET AL  3,045,569
PHOTOGRAPHIC APPARATUS

Filed Nov. 21, 1958  5 Sheets-Sheet 1

FIG. 1

INVENTORS
Joseph H. Booth
BY Maxfield Parrish, Jr.
Gromward Mikulka
Robert J. Schiller
ATTORNEYS

FIG. 2

July 24, 1962 J. H. BOOTH ET AL 3,045,569
PHOTOGRAPHIC APPARATUS

Filed Nov. 21, 1958 5 Sheets-Sheet 3

INVENTORS
Joseph H. Booth
and
BY Maxfield Parrish, Jr.
Brown and Mikulka
and
Robert J. Schiller
ATTORNEYS

United States Patent Office 3,045,569
Patented July 24, 1962

1

3,045,569
PHOTOGRAPHIC APPARATUS
Joseph H. Booth, Belmont, and Maxfield Parrish, Jr., Lexington, Mass., assignors to Polaroid Corporation, Cambridge, Mass., a corporation of Delaware
Filed Nov. 21, 1958, Ser. No. 775,444
19 Claims. (Cl. 95—10)

This invention relates to photography and more particularly to photoelectrically controlled camera shutter-and-diaphragm assemblies.

A principal object of the present invention is to provide a novel shutter mechanism comprising a movably mounted shutter blade for effecting exposures, said mechanism including means for controlling the time intervals of said exposures responsively to the intensity of light of the field of view of the shutter mechanism as determined by photoelectric means.

Another object of the present invention is to provide a novel shutter comprising a diaphragm, means for providing an effective exposure aperture, and means for determining the magnitude of said effective exposure aperture responsively to the intensity of light of the field of view of the shutter mechanism as determined by photoelectric means.

Other objects of the present invention are to provide a novel shutter comprising a rotatably mounted shutter blade of the essentially free-rotating type in which the exposure interval which may be effected thereby is a function of the degree of rotation of said blade, a rotatably mounted diaphragm means for providing an effective exposure aperture of variable magnitude and cooperating with said shutter blade for determining exposures, and means for controlling both the degree of rotation of said shutter blade and the magnitude of the effective exposure aperture provided by said diaphragm, the control provided by the last-named means being a function of the intensity of light of the field of view of the shutter mechanism; and to provide, in a shutter mechanism of the type described, a movable diaphragm having a plurality of diaphragm openings of graded size disposed therein, control means responsive to light intensity of the field of view of the shutter for aligning a predetermined one of said openings with an exposure aperture in accordance with the intensity of said light, a shutter blade of the essentially free-moving type characterized in that the exposure interval afforded by the actuation thereof is a function of the total arcuate travel of said blade, and means for varying the total arcuate travel of said blade in accordance with the alignment of said diaphragm openings with said exposure aperture.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a schematic front elevational view of another

2 embodiment of the invention with the elements thereof in rest position;

In general, this invention relates to a novel camera shutter-and-diaphragm assembly in which both shutter speed and effective exposure aperture are controlled responsively to the light intensity of the field of view of the assembly as determined by a photoelectric means. The assembly preferably comprises a shutter mechanism of the essentially free-moving type such as is described in U.S. Patent No. 2,752,834, issued on July 3, 1956, to M. N. Fairbank. In the preferred form of the invention, a movable shutter member such as a blade is normally mounted upon a housing in a covering relation to an exposure aperture disposed in the housing. As a means for imparting an aperture-uncovering movement to the blade, there is provided an impulse member or "kicker." The kicker is normally held by a latch means in a stationary position wherein a spring means for powering the kicker is energized. A tripping means such as a lever is disposed for releasing the latch means whereby the kicker is allowed to move under the bias of the energized spring means to strike a portion of the shutter blade. The blade, under the striking impetus of the kicker, is thus rotated at a substantially constant speed determined by its inertia and by said impetus from its aperture-covering position to an aperture-uncovering position.

As a means for limiting the total extent of travel of the blade, there is preferably provided reversing means adapted to momentarily engage the shutter blade during movement from aperture-covering position, and for reversing said movement and returning the blade to the aperture-covering position. A preferred embodiment of the reversing means comprises at least one resilient element such as a bounce spring, which is disposed for intercepting and reversing the shutter blade at a predetermined point in its arcuate travel. It is, of course, apparent that the exposure time interval afforded by the uncovering movement of the blade is a function of the degree of rotation of the blade as determined by the location of the intercepting bounce spring. One or more of the bounce springs may be mounted for individual movement with respect to the path of travel of the blade so as to allow the blade to pass freely when the springs are out of the path, and to reverse the movement of the blade when at least one of the springs is in the path. In the preferred form of the present invention, a plurality of bounce springs is provided, means being provided for controlling the movement of the springs in and out of shutter blade engaging positions. The latter means preferably comprises a cam means, the position of which is responsive to the intensity of light of the field of view of the shutter as determined by photoelectric means such as a photovoltaic or photoconductive cell.

In the present invention, means are provided for variably determining an effective exposure aperture, the effective exposure aperture being defined herein as the total cross-sectional area through which incident light may be admitted by a combination of a diaphragm means and an exposure aperture of a lens system. Such a diaphragm means is mounted for cooperation with an exposure aperture for providing a sequence of effective exposure apertures and in one form comprises a disk having a plurality of openings of graded area arcuately spaced about the disk. The disk is mounted for movement, preferably rotational, within the shutter housing so that each of the openings may be selectively brought into an aligned relationship with the exposure aperture. In the preferred form of the present invention, the diaphragm is also provided with a plurality of engagement portions so distributed about the diaphragm that engagement of any one of said engagement portions with a movable stop means during movement of the diaphragm arrests diaphragm movement and establishes an effective exposure aperture of predetermined size, as for instance, by aligning a corresponding opening with the exposure aperture. The cam means, hereinbefore mentioned, for controlling the movement of the bounce springs, preferably is formed as an integral portion of the diaphragm so that when the diaphragm is moved to establish a predetermined effective exposure aperture, the cam means likewise is positioned to control the positioning of the bounce springs.

As a means for controlling the aperture determining movement of the diaphragm, there is preferably provided stop means movable through a plurality of positions for engaging at each of said positions a corresponding one of the various engagement portions. In the preferred form, the stop means is movable by means such as a galvanometer responsively to the light intensity of the shutter field of view, the galvanometer, of course, being connected with and responsive to the photoelectric means. The stop means is so disposed that each of the plurality of positions, wherein an engagement portion may be engaged, corresponds to a predetermined light intensity. As, for example, the positioning of the openings of the disk relative to the exposure aperture and the positioning of the associated cam means for controlling the movement of the bounce springs are both determined by the engagement of one of said engagement portions with the stop means, the exposure time interval and effective exposure aperture of the shutter mechanism are therefore controlled in accordance with variations in the intensity of the light.

Figure 1:
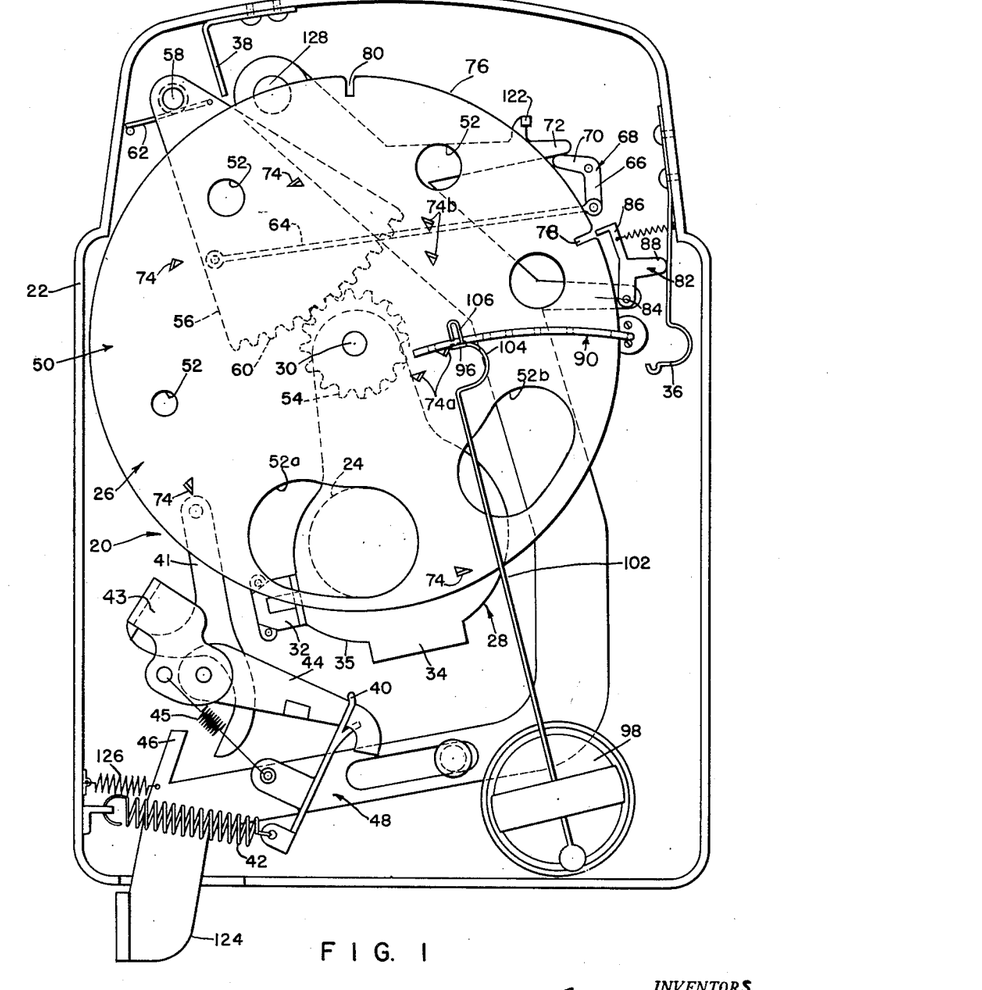
FIGURE 1 is a schematic front elevation of one embodiment of the invention showing the elements thereof in rest position.
Figure 2:
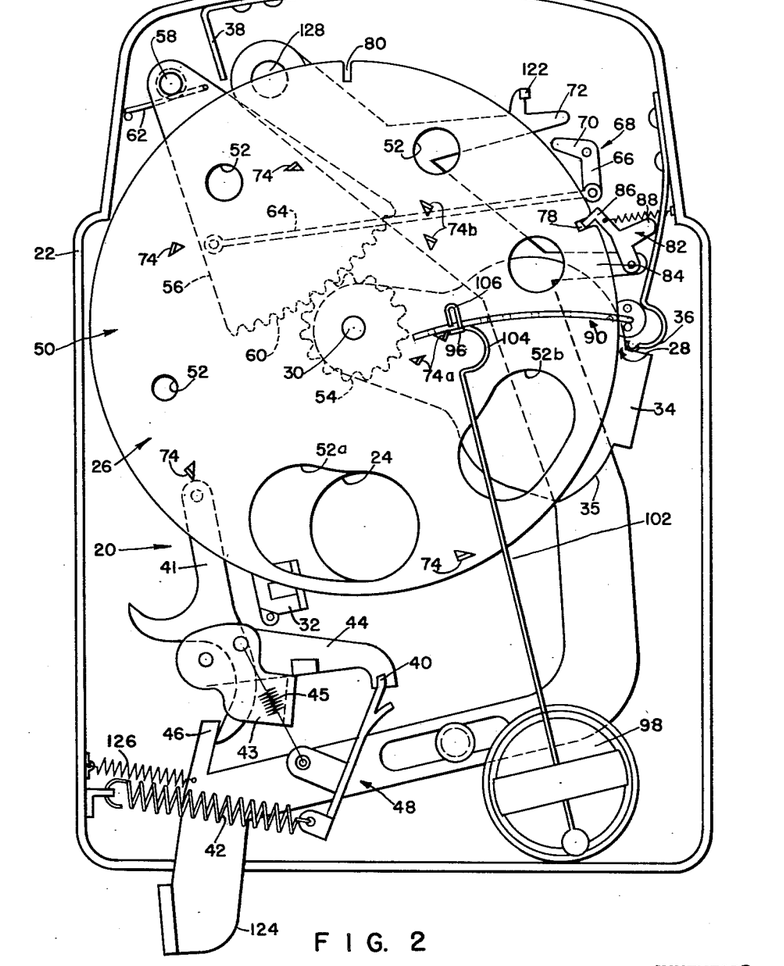
FIG. 2 is a schematic view of the embodiment of FIGURE 1 showing the elements thereof in a displaced position during exposure.

Referring now to the various drawings wherein like numerals denote like parts, the preferred constructional features of the present invention will be readily apparent. Referring particularly to FIGS. 1 and 2, the shutter-and-diaphragm assembly indicated generally by the reference numeral 20 includes a housing portion 22. Suitably disposed in the housing portion is a camera lens system (not shown) which is represented in cross-section by exposure aperture 24. Disposed across the optical axis of the lens system and mounted on housing portion 22 is a diaphragm means 26 and a movable shutter member such as shutter blade 28.

Shutter blade 28 is rotatably mounted upon suitable bearing means indicated at 30, the bearing means preferably having a minimal amount of friction. For normally retaining the shutter blade in a position of rest wherein the shutter blade covers aperture 24, there is provided a releasable retaining means which comprises, in the preferred form, a magnet 32. Consequently, it is apparent that at least a portion of the shutter blade should be formed of a magnetizable substance to allow magnet 32 to retain same. The shutter blade 28, in the form shown, preferably comprises a sector-shaped, planar blade having a projecting portion or lug 34 extending radially therefrom beyond the outer periphery 35 of the arcuate portion of the sector. As may be seen in FIGS. 1 and 2, there are provided a plurality of reversing means, such as bounce springs 36 and 38, which are mounted upon housing portion 22 and positioned adjacent to the path of travel of lug 34, which path is defined by the rotation of the shutter blade about the pivotal axis provided by bearing means 30. As a means for initiating rotation of the shutter blade about the bearing means, there is provided an impact means such as kicker 40 which is biased for movement in a clockwise direction by resilient means, for example kicker spring 42. Kicker 40 is releasably restrained from movement in the clockwise direction and held in a restrained position, as shown, by a latch means such as first latch 44. As a means for releasing latch 44 from kicker 40 and thereby allowing the kicker to rotate in a clockwise direction under the bias of spring 42, there is provided, for example, actuating portion 46 of actuating lever 48. Actuating portion 46 is so disposed as to engage second latch 41 after a predetermined movement of lever 48. Second latch 41 is disposed in releasable engagement with a rotatable inertia member 43 which is biased for rotation by resilient means such as spring 45.

To effect an exposure, actuating lever 48 is moved to a predetermined position at which actuating portion 46 engages second latch 41, releasing the second latch from the inertia member 43 which is then allowed to rotate into engagement with first latch 44, releasing latch 44 and thus permitting the kicker to rotate rapidly in a clockwise direction under the bias of spring 42. In the preferred embodiment, kicker 40 is so disposable relative to lug 34 that the rotation of the kicker is transmitted by the impact thereof against the lug, overcoming the retaining force of magnet 32 and causing shutter blade 28 to rotate rapidly in a counterclockwise direction about bearing means 30 from its position of rest. Rotation of the shutter blade in the counterclockwise direction uncovers aperture 24, thus allowing light from the lens assembly to pass through the shutter-and-diaphragm assembly 20. The rotation of the shutter blade in the counterclockwise direction continues until lug 34 strikes a bounce spring disposed in the path of the blade. In the example shown in FIGS. 1 and 2, bounce spring 38 is so disposed in the path of the blade that it may cause reversal of the direction of the rotation of the blade upon impact for returning the blade to its rest position at which magnet 32 re-engages and retains the blade, the exposure aperture being thus again covered by the blade. Devices having shutter blades adapted for incorporation in the present invention may be seen by way of example, but not necessarily being limited thereto, in the aforementioned Fairbank patent, in U.S. Patent No. 2,531,936, issued November 28, 1950, to M. N. Fairbank, and in the copending application, Serial No. 388,641, filed October 27, 1953, by Sidney B. Whittier, now U.S. Patent No. 2,877,697.

In the preferred form of the present invention, bounce springs 36 and 38 both comprise at least resilient portions adapted to engage lug 34 of the shutter blade during the rotation of the latter, and are also adapted to absorb energy from the shutter blade upon engagement therewith and to transmit the absorbed energy back to the blade for providing the impetus which returns the blade to its rest position. Bounce spring 36 is mounted upon housing portion 22 so that it may be moved in and out of the path of travel of the shutter blade. Spring 36 is preferably formed of a resilient substance such as Phosphor bronze or spring steel so that it may also be retained in a position out of the path of travel of the shutter blade and, when released from the latter position, will move into an intersecting position in said path by virtue of its own resiliency. Bounce spring 38, on the other hand, is preferably disposed in a predetermined position for engaging and establishing the extreme limit of the arcuate travel of the shutter blade, hence need not be movable. It should be noted that provision may be made for additional movable bounce springs similar to spring 36, which springs may be located at other positions peripherally adjacent the arcuate path of travel of the shutter blade between its rest position and the limiting position defined by spring 38.

One form of a diaphragm means, shown in FIGS. 1 and 2 and indicated generally by the numeral 26, preferably comprises a substantially planar element, such as disk 50, mounted for rotation about a pivotal axis disposed approximately parallel to the lens axis so that the rotation of the element is substantially in a plane perpendicular to the axis of the lens assembly. In the form shown, disk 50 is mounted with its pivotal axis in approximately colinear relation with the pivotal axis of the shutter blade and the plane of rotation of the disk is therefore also substantially parallel to the plane of movement of the shutter blade. The disk includes a plurality of openings 52 (including a number of special openings such as 52a and 52b) formed therein, the openings being preferably provided as a graded succession of different areas disposed in sequence adjacent to the circular periphery of disk 50 in order of their respective magnitudes. The openings are so disposed that upon rotation of the disk, each of said openings may be aligned successively in approximate uncovering relationship to aperture 24. As may be seen in the drawings, a number of the openings of smaller area are circular in shape while, in the preferred embodiment, the two largest openings 52a and 52b may be formed for instance, respectively, from two approximately circular openings of substantially identical size with their respective centers displaced approximately a common radius apart.

As a means for rotating disk 50, there is, in the preferred form, a circular gear 54 mounted for rotation integrally with and having a common pivotal axis with disk 50. A gear segment 56 is mounted for pivotal movement on housing portion 22 about suitable bearing means 58 such that gear teeth 60 of segment 56 are in meshing engagement with gear 54. Gear segment 56 is preferably pivotally movable in a plane approximately parallel with the plane of movement of disk 50 and is, in the form shown, urged in a counterclockwise direction by resilient means such as spring 62. As a means for releasably retaining segment 56 against the bias of spring 62 and for controlling the movement of segment 56 both with and against the bias of spring 62, there is provided a linkage which preferably comprises elongated link 64. One extremity of link 64 is pivotally mounted upon a medial portion of gear segment 56, the other extremity of the link being pivotally mounted upon first finger portion 66 of bell crank 68. Bell crank 68 includes a second finger portion 70 disposed at a predetermined angle with respect to first finger portion 66 and is mounted for pivotal movement on housing 22 such that second finger portion 70 is in slidable engagement with diaphragm-actuating portion 72 of actuating lever 48. With this arrangement of parts, a predetermined movement of the actuating lever by manipulation of an operator, permits bell crank 68 to rotate in a clockwise direction as the restraint imposed upon the counterclockwise rotation of gear segment 56 by link 64 is released, and the gear segment is permitted thereby to rotate in a counterclockwise direction under the bias of spring 62 for rotating disk 50 about its pivotal axis.

As a means for aligning a predetermined one of openings 52 with exposure aperture 24, disk 50 is preferably provided with a plurality of engagement portions, each of which portions corresponds in a predetermined manner to a given one of openings 52. In the form shown, the engagement portions comprise small upstanding members, which may for easy manufacture be raised or punched, disposed approximately normally to the surface of disk 50 in the form of small serrations 74. The serrations are preferably distributed about the pivotal axis of the disk in a predetermined manner, such as a spiral, such that each of serrations 74 is at a predetermined and individual radial distance from the pivotal axis of disk 50. It should be noted that for each of openings 52a and 52b, which openings are effectively double openings, there is preferably provided double serrations 74a and 74b which correspond approximately to the centers of the circular openings from which openings 52a and 52b are formed, thereby providing for each of openings 52a and 52b, two positions at which portions of the respective openings may be aligned with aperture 24.

As a cam means for controlling exposure time interval, disk 50 is provided with a configuration which, in the form shown, comprises the arcuate periphery 76 of the disk and which includes a plurality of identations therein such as notches 78 and 80, the notches being predeterminedly angularly spaced with respect to predetermined ones of engagement portions 74. As a means responsive to the cam means provided by periphery 76 and notches 78 and 80, there is provided a cam element 82 which is pivotally mounted upon extending portion 84 of actuating lever 48, and which comprises an approximately Y-shaped element having a cam follower portion 86 disposed in slidable engagement with periphery 76 and shaped for engagement with either one of notches 78 and 80. Cam element 82 also includes a spring controlling portion 88 which is so disposed in slidable engagement with bounce spring 36 as to retain the bounce spring out of the path of arcuate travel of blade 28 when follower portion 86 is in engagement with arcuate portions of periphery 76. It is readily apparent that when follower portion 86 is in engagement with one of notches 78 or 80, cam element 82 is so rotated as to release bounce spring 36 sufficiently that the bounce spring moves under its own resiliency into an intersecting position with the arcuate path of travel of lug 34.

Figure 3:
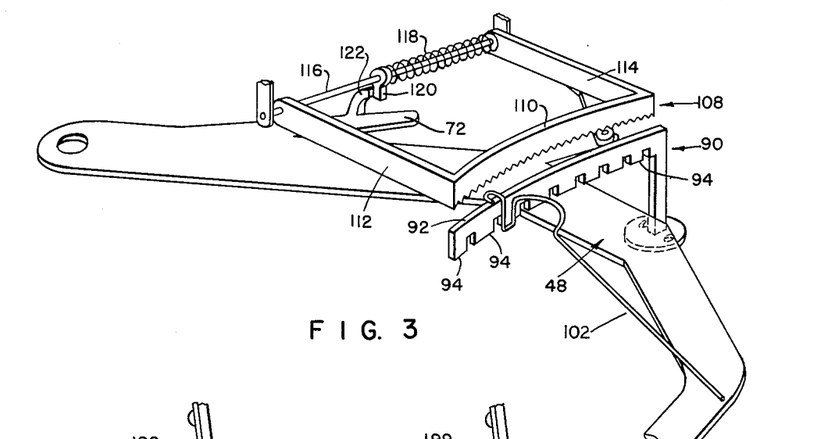
FIG. 3 is a perspective view of a portion of the embodiment of FIGURE 1 showing the clamping mechanism with associated elements in fragment.

As a means for controlling the rotational travel of disk 50, there is provided a stop means which comprises a comb-like member 90 (as shown in FIG. 3) characterized in having an elongated spine 92 with a plurality of substantially identical teeth 94 extending perpendicularly from the spine in a regularly spaced relationship to one another. Comb 90 is so disposed with spine 92 approximately parallel to the plane of disk 50 and teeth 94 approximately perpendicular to the plane of the disk, that serrations 74 on disk 50 may move freely between the teeth of the comb during rotation of the disk.

The stop means also comprises stop member 96 which is movable along a path in a plane approximately parallel to the plane of disk 50 and to the array presented by the plurality of teeth 94. Stop member 96 is movable along said path through a plurality of positions at which the stop member sequentially obstructs the spaces between teeth 94 of comb 90, and thus may be positioned for arresting movement of the predetermined one of serrations 74 which would otherwise be normally free to move through the particular space obstructed. As a means for so moving stop member 96, there is provided an element, such as galvanometer 98, which is coupled with and responsive to signals produced by a photocell (not shown) in accordance with the intensity of light incident on the photocell. Stop member 96 preferably is attached adjacent the moving extremity of needle 102 of the galvanometer as an integral portion thereof, needle 102 being so formed as to have an arcuate portion 104 provided therein between stop member 96 and the main body of the galvanometer as a spring means for absorbing a portion of the energy of impact of one of serrations 74 upon stop member 96. Additionally, needle 102 includes a clampable portion 106 which is adapted to extend across spine 92 and is so disposed that, with motion of the galvanometer and needle, clampable portion 106 will traverse the length of spine 92 preferably as closely thereto as may be commensurate with allowable mechanical tolerances.

As a means for locking needle 102 in a position predetermined by the intensity of light incident upon the photocell, and therefore locking stop member 96 in a predetermined position relative to teeth 94 of comb member 90, there is provided a clamping mechanism, a preferred embodiment of which may be seen in FIG. 3 and which has been omitted from FIGS. 1 and 2 only for the sake of clarity. The clamping mechanism preferably comprises a yoke-like element, indicated generally by the reference numeral 108, having a central portion 110 of approximately the same length as spine 92 and adapted to be moved toward engagement with spine 92 throughout the length thereof, and two arms 112 and 114 appended to central portion 110. Those extremities of arms 112 and 114 which are not attached to central portion 110 are fixedly mounted for rotation upon a suitable bearing means such as axle 116. Resilient means such as spring 118 are provided for urging the yoke-like element 108 in a direction wherein element 108 is rotated about axle 116 until the rotation is arrested by the engagement of both central portion 110 and spine 92 with clampable portion 106 therebetween. As a means for rotating element 108 against the bias provided by spring 118, axle 116 is preferably provided with a lever 120 which, in the form shown, is rigidly affixed to the axle and extends perpendicularly to the longitudinal axis thereof, lever 120 being adapted to engage a means such as upstanding portion 122 for releasably retaining the clamping mechanism in an unclamped or open position wherein spring 118 is maintained under tension. Upstanding portion 122 preferably comprises a bar attached, for the sake of convenience, to actuating lever 48 as on actuating portion 72. It should be noted that actuating portion 72 is so disposed that upstanding portion 122 is located normally in engagement with lever 120 so as to maintain the clamping mechanism in an open position when actuating lever 48 is in a rest position.

In operation, manipulation of manually engageable portion 124 moves actuating lever 48 from a position of rest, wherein lever 48 is retained by resilient means such as spring 126, and rotates lever 48 in a counterclockwise direction about pivot 128. The counterclockwise movement of lever 48 moves actuating portion 72, thereby releasing the restraint imposed upon first finger portion 70 of rocker arm 68. The force exerted by spring 62 upon gear segment 56 (which force has been restrained from rotating the gear segment by link 64 which is pivotally attached to both rocker arm 68 and to gear segment 56), now urges the gear segment in a clockwise direction, causing disk 50 to rotate in a counterclockwise direction by virtue of the engagement of the gear segment with gear 54. In the preferred embodiment, the force exerted by spring 62 causes disk 50 to rotate in a substantially rapid manner.

The movement of actuating portion 72 which releases rocker arm 68 from restraint also moves upstanding portion 122 out of engagement with lever 120 and allows spring 118 to urge element 108 toward engagement with spine 92 of comb member 90. The photocell preferably has a photosensitive surface exposed substantially normally to and subtending the angular field of view of aperture 24. Light incident upon the photocell is translated into electrical signals which are fed into galvanometer 98, the signals being a function of the intensity of the light. Consequently, the galvanometer rotates needle 102 responsively to said signals between a first position representing a minimum light intensity, the first position preferably disposing member 96 adjacent the pivotal axis of disk 50, and a second position representing the maximum responsiveness of the galvanometer to the light intensity, the second position preferably disposing member 96 adjacent the periphery of disk 50. The arcuate travel of needle 102 between the first position and the second position is preferably such that member 96 moves in an approximately radial direction from the pivotal axis of the disk to the periphery thereof and approximately parallel to the array provided by teeth 94. Hence, the position which the needle takes in response to a particular light intensity results in stop member 96 obstructing the space between a predetermined pair of teeth 94 in comb-like member 90. In order to assure the obstruction of a predetermined space between a pair of teeth, the stop member is preferably dimensioned to be wider than said predetermined space such that the passage of one of serrations 74 through said space is positively obstructed. It should be noted that when the stop member obstructs a predetermined space in accordance with the position of equilibrium assumed by galvanometer 98, the rotation of disk 50 continues until one of serrations 74 corresponding to the predetermined space is obstructed by striking stop member 96. As the path of travel of stop member 96 from the first position to the second position is closely adjacent the array provided by teeth 94, the greater part of the energy of impact of the serration upon the stop member is absorbed by comb member 90 when stop member 96 is forced against the teeth under the impact. Additionally, a portion of the energy of impact absorbed by stop member 96 itself is taken up by arcuate portion 104 of needle 102, thereby relieving strain upon the possibly delicate bearings of the stop member moving means such as galvanometer 98.

The counterclockwise rotation of the disk, initially being at a substantially rapid pace, tends to carry notches 78 and 80 past follower portion 86 without portion 86 engaging the notches, both the follower portion and the notches being so shaped as to be in engagement only when disk 50 is substantially stationary, portion 86 not being energized to move until the disk is at rest. In the event that upon the obstruction of a predetermined one of serrations 74 the rotation of disk 50 is arrested with one of notches 78 and 80 substantially adjacent the position of follower portion 86, portion 86 will engage the notch, thereby permitting bounce spring 36 to move into the path of rotation of shutter blade 28 and consequently shortening the arcuate path of travel of the shutter blade. When the disk is arrested such that one of notches 78 and 80 is not adjacent to the position of follower portion 86, portion 86 is retained in its normal position in slidable engagement with the outer periphery of disk 50 and therefore retains bounce spring 36 out of the path of arcuate travel of shutter blade 28, consequently allowing the shutter blade to rotate until engaged by bounce spring 38, thus providing the maximum path length of travel of the shutter blade and the longest exposure time interval. It is readily apparent that in the preferred embodiment as shown in the drawings, notch 78 is so disposed that engagement of the notch with follower portion 86 occurs when one of the two serrations 74a (corresponding to one of the two positions at which opening 52a uncovers aperture 24) is engaged by stop member 96. Similarly, notch 80 is disposed for engagement with portion 86, corresponding to one alignment of opening 52b with aperture 24. In this manner, both long and short exposure intervals are afforded during which the effective exposure aperture provided by disk 50 is of the same size. It will be understood that the inclusion of openings such as 52a and 52b in this invention, in the form shown, thereby provide more space on disk 50 upon which serrations 74 may be disposed. It is obvious that an alternative form of the invention may include separate and substantially identical openings in place of a single opening such as 52a.

As may be seen in the drawings, the manipulation of actuating lever 48 for initiating rotation of disk 50 and for releasing the clamping mechanism, also operates latch 44 for initiating rotation of the shutter blade after needle 102 has been clamped and the one of openings 52 corresponding to the light intensity incident on the photocell has assumed its uncovering position relative to aperture 24.

It is to be understood that means may be provided for uncoupling the galvanometer from the photocell and for synchronizing the operation of the shutter blade with a photoflash switch such that the invention may be adapted for use in flash photography. Additionally, means may be provided for locking the shutter blade in an open position wherein the assembly may be employed for "bulb" exposures. There are shown in the drawings eight positions at which the stop member may obstruct different spaces between the teeth of comb-like member 90, and eight corresponding possible combinations of openings 52 with aperture 24, but it is readily apparent that more or less of said positions and of said combinations of openings and aperture may be provided.

Another embodiment of the present invention employing a similar shutter mechanism is shown in FIGS. 4 through 7 and includes a diaphragm means, generally indicated at 136, which is the counterpart of diaphragm means 26 in the previous embodiment. Diaphragm means 136 preferably comprises a multiple-leaved element, which in the form shown includes at least two thin, substantially planar, metal leaves 138 and 140 which are pivotally mounted at one respective extremity thereof on housing portion 142 by suitable bearing means such as stud 144. As a means for defining an effective exposure aperture, leaf 138 is provided in a portion thereof which normally overlies exposure aperture 146 with a notch 148 which preferably has a V-shape such as a right angle; leaf 140 is provided with a similar notch 150. Leaves 138 and 140 are so disposed that the notches may be combined to provide a substantially square opening 152 disposed symmetrically about the optic axis of exposure aperture 146.

Figure 4:
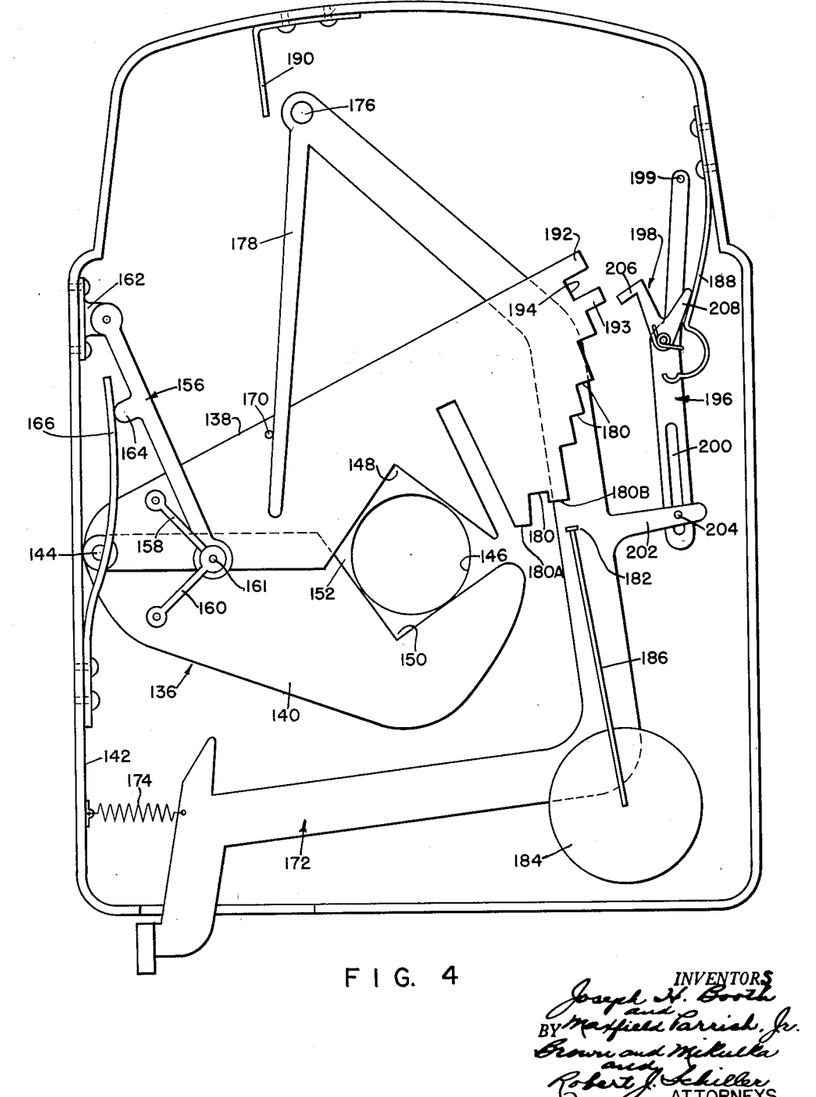
Figure 5:
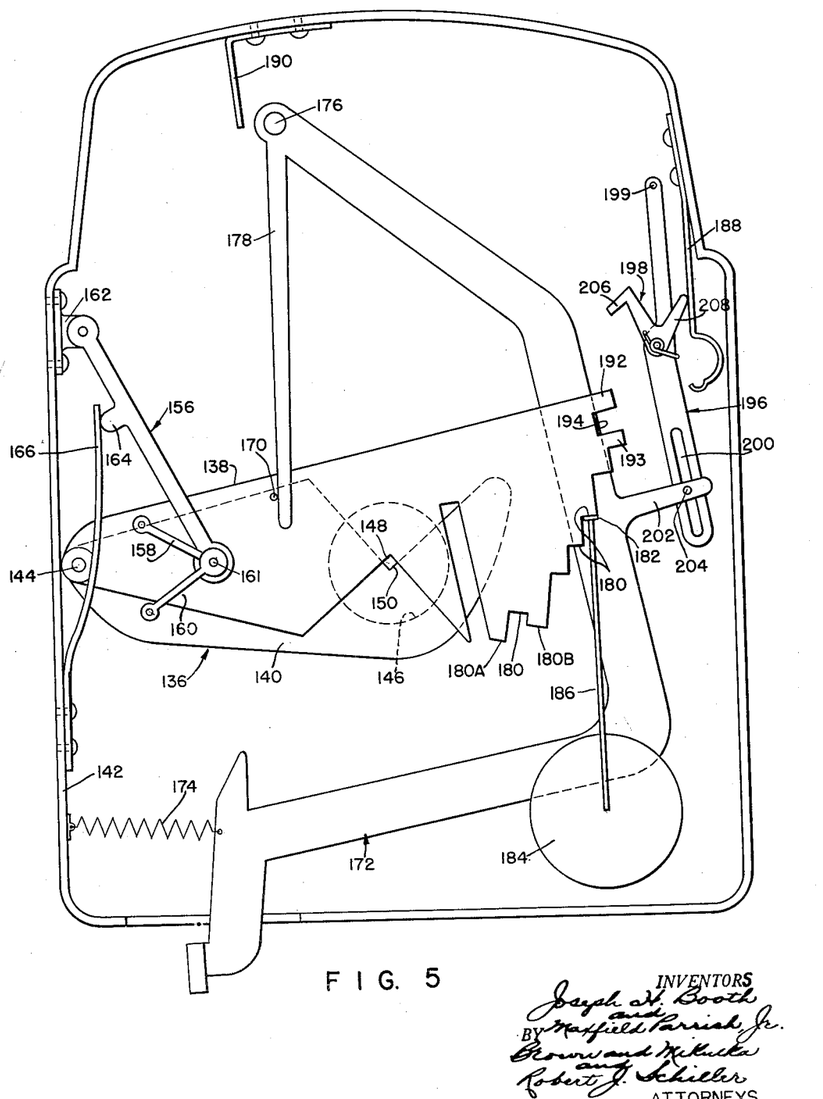
FIG. 5 is a schematic view of the embodiment of FIG. 4 showing the elements thereof in a displaced position.
Figure 6:
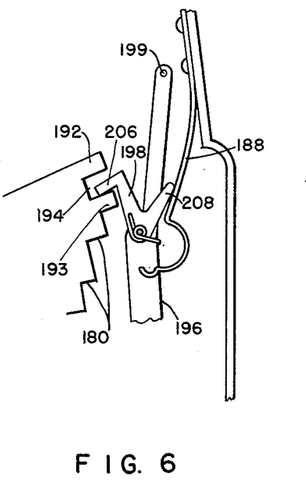
FIG. 6 is a schematic view of a cam and cam follower device of FIG. 4 showing the cam follower out of engagement with the cam.
Figure 7:
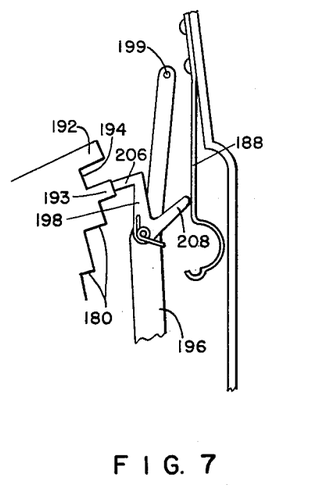
FIG. 7 is another view of the elements of FIG. 6 showing the cam follower in engagement with the cam.

As a means for varying the size of opening 152 and for providing a sequence of effective exposure apertures by the combination of opening 152 with exposure aperture 146, there is provided a simple connecting linkage for moving the iris leaves oppositely to one another in closely adjacent and approximately parallel planes symmetrically about the optic axis of aperture 146. In the form shown, the linkage comprises a pair of tong arms 158 and 160 and an elongated element 156, resilient means being provided for biasing the leaves through said linkage into a position wherein the square opening defined by notches 148 and 150 is at a minimum or is nonexistent. In the form shown, first arm 158 and second arm 160 are disposed at an angle to one another, first arm 158 being pivotally attached at one extremity to leaf 138 adjacent stud 144, and second arm 160 being pivotally attached at one extremity to leaf 140 adjacent to the stud. Elongated element 156 comprises a lever which is pivotally attached at one extremity thereof to an upstanding member or bracket 162 attached to housing portion 142. The other extremity of element 156 and the other extremities of arms 158 and 160 are pivotally attached to one another by suitable means such as pivot 161. Element 156 is also provided intermediate to its extremity with a nose portion 164 extending laterally therefrom. The resilient means, in the preferred embodiment, comprises leaf spring 166, one extremity of which is preferably attached to housing portion 142, the other extremity of which is disposed in slidable engagement with nose portion 164 of element 156. Attached to and forming an integral part of leaf 138 is an engageable element such as pin 170 which is mounted to extend approximately perpendicularly from the plane thereof.

As a means for actuating the mechanism provided by the invention, there is included an actuating lever 172 which is retained in a first position by resilient means such as spring 174 and which may be rotated about pivot 176 mounted on housing portion 142 by manipulation of an operator against the bias of spring 174. Actuating lever 172 is provided thereon with a portion (not shown) for initiating the exposure movement of a shutter mechanism, as for instance previously shown, by tripping a latch to release a kicker which strikes the shutter blade. For the sake of simplicity and clarity in the drawings, a showing of a portion of the shutter mechanism, such as kicker and blade, has been omitted in FIGS. 4 through 7, but it is understood that such portion of the shutter mechanism has the structure, form and operation previously described herein.

Actuating lever 172 is, in the form shown, provided with an extending portion 178 for actuating diaphragm means 136 in timed relationship with the operation of the shutter mechanism. Extending portion 178 preferably extends from the actuating lever into sliding engagement with pin 170 such that when actuating lever 172 is in the first position, extending portion 178 (by virtue of the engagement with pin 170) restrains diaphragm leaves 138 and 140 from movement toward one another, the leaves being retained at maximum separation from one another for providing a maximum aperture. The various parts are so arranged that upon rotation by an operator of actuating lever 172 about pivot 176 in a counterclockwise direction from the first position, extending portion 178 rotates in a counterclockwise direction thus releasing the restraint imposed upon pin 170 and allowing leaves 138 and 140 to rotate in opposite directions to one another under the bias imposed by spring 166 operating through the linkage provided by tongs 158 and 160 and element 156. The movement of the leaves, upon release of the restraint upon pin 170, is, from a first position wherein said leaves completely uncover aperture 146, toward one another to present an effective exposure aperture defined by the combination of notches 148 to 150 with the exposure aperture, the effective exposure aperture thus provided becoming smaller in area with the continued rotation of actuating lever 172 in the counterclockwise direction.

In this embodiment of the invention, the diaphragm is provided with a plurality of engagement portions so disposed that engagement of any one of the engagement portions with a movable stop means, during movement of the diaphragm leaves from the first position, arrests the movement of the leaves and establishes an effective exposure aperture in accordance with the position of the stop means. In the form shown, the engagement portions comprise a series of notches or steps 180 disposed adjacent the unpivoted extremity of leaf 138, the steps being arranged in a predetermined manner such that each of steps 180 is at a predetermined and individual radial distance from the pivotal axis 144 of leaf 138. As a means for controlling the extent of the movement of the leaves from their first position, there is provided a stop means which comprises a stop member 182 which is so movable, along a path in a plane approximately parallel to the plane of leaf 138 and at an angle to the array presented by the plurality of steps 180, that any one of steps 180 may be engaged by stop member 182 according to the positioning of the stop member along said path.

As a means for so moving the stop member there is provided an element, such as galvanometer 184, which is coupled with and responsive to signals produced by a photocell (not shown) in accordance with the intensity of light incident on the photocell. Stop member 182 is preferably attached at the moving extremity of needle 186 of the galvanometer as an integral portion thereof and preferably extends perpendicularly to the longitudinal axis of needle 186 in order to guarantee positive engagement upon any one of steps 180. Because the speed of movement of leaves 138 and 140 in diminishing the size of opening 152 upon movement of the actuating lever is largely dependent upon the strength of spring 166, the movement may be adjusted to be relatively slow by providing spring 166 with a comparatively small force. Consequently, the engagement of one of steps 180 with stop member 182 offers a very small impact and imposes a comparatively small force upon the bearings of needle 186. However, it is apparent that a support member disposed parallel with the arcuate path of stop member 182 may be provided to relieve the bearings of needle 186 from any strain imposed by the engagement of the steps with the stop member. It is also apparent that because steps 180 are biased into an engagement position with stop member 182 by spring 166, the engaging force thus imposed will lock needle 186 into a releasably retained position. However, a means for clamping the needle when in a position of engagement may also be provided.

In the embodiment of the invention shown in FIGS. 4 through 7, bounce springs 188 and 190 are the counterparts, respectively, of bounce springs 36 and 38 as shown in the embodiment described in FIGS. 1 and 2. Bounce spring 190 is therefore disposed relative to the shutter blade path similarly to bounce spring 38, is formed of the same materials and performs substantially the same function as bounce spring 38. Bounce spring 188 is also preferably formed of the same material and performs a substantially identical function to bounce spring 36 in the previously described embodiment.

As a cam means for controlling exposure time intervals, leaf 138 is provided with a configuration which, in the form shown, includes at least two extending portions such as cams 192 and 193, disposed at the unpivoted extremity of leaf 138 and separated from one another by notch 194. Cams 192 and 193 are preferably disposed adjacent to steps 180 and are predeterminedly angularly spaced, relative to the pivotal center provided by stud 144, with respect to two predetermined and corresponding members of steps 180 such as steps 180A and 180B.

As a means responsive to the cam means provided by cams 192 and 193, there is provided a cam element which comprises a rocker bar 196 and cam follower 198. In the form shown, rocker bar 196 is pivotally mounted, by suitable bearing means such as pivot 199, at one extremity thereof upon housing portion 142, and is provided at the other extremity thereof with a longitudinal opening or slot 200. Mounted upon second extending portion 202 of actuating lever 172 is a stud or pivot 204, which is so disposed in slidable and pivotal engagement with slot 200 that the rotation of actuating lever 172 in a counterclockwise direction causes rocker bar 196 to rotate in a counterclockwise direction about pivot 199 in sliding engagement with the actuating lever. Cam follower 198 preferably comprises an approximately hoe-shaped element which includes an engagement blade 206 at one extremity thereof and which is pivotally mounted at the other extremity thereof upon a medial portion of rocker arm 196. Cam follower 198 also includes, intermediate from its extremities, a nose portion 208 which extends approximately perpendicularly therefrom and in the opposite direction to the extension of engagement blade 206. The pivotal disposition of cam follower 198 upon rocker bar 196 is such that upon rotation of rocker bar 196, engagement blade 206 is movable in and out of engagement with cams 192 and 193. With the engagement of blade 206 with one of cams 192 and 193, nose portion 208 is moved to a first position of engagement with bounce spring 188 wherein the bounce spring is retained out of the path of engagement of the shutter blade, thereby lengthening the path of travel of the shutter blade and hence increasing the exposure time interval. With the movement of blade 206 out of engagement with one of the cam portions, nose portion 208 is movable to a second position of engagement with bounce spring 188 wherein the bounce spring is allowed to move under its own resiliency into an intersecting position with respect to the path of the shutter blade. It is readily apparent that in this embodiment of the invention, cam 192 is so disposed that engagement of the cam with blade 206 occurs when one of the two steps 180A and 180B is engaged by stop member 182. In this manner, both long and short exposure intervals are afforded during which the effective exposure apertures provided by the diaphragm means 136 are of substantially the same size. It is to be noted that this arrangement is, in a sense, the opposite of the device previously disclosed in that it provides for long exposures where the previous device provides for short exposures and vice versa. It is obvious that by simple alteration of the movement of the cam follower means, the timing of the exposure intervals as long or short may be reversed; and by adding additional cams similar to cams 192 and 193, additional variations in exposure intervals may be attained.

In alternative embodiments, means may be provided whereby the mechanism is rendered inoperative when the light intensity upon the photocell falls below a predetermined minimal requirement and means may also be provided for physically indicating that the mechanism has been rendered inoperative.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a shutter mechanism cooperating with a photoelectric means for producing electrical signals in accordance with the intensity of light incident thereon, in combination, a movable shutter blade for effecting exposures and being characterized in that the time interval of an exposure afforded thereby is a function of the total travel of said blade, means mounted for positioning in the path of travel of said blade for variably limiting said travel, movable diaphragm means for providing an effective exposure aperture of variable magnitude, means responsive to said signals both for variably limiting the movement of said diaphragm means and for controlling the positioning of said means for limiting said travel, and actuating means for initiating movement of said diaphragm means and for initiating movement of said shutter blade.

2. In a shutter mechanism cooperating with a photoelectric means for producing electrical signals in accordance with the intensity of light incident thereon, in combination, means for defining an exposure aperture, a shutter blade mounted for movement with respect to said aperture for effecting exposures and being characterized in that the time interval of an exposure afforded thereby is a function of the total travel of said blade, means mounted for positioning in and out of the path of travel of said blade for variably limiting said travel, diaphragm means mounted for movement relative to said exposure aperture and cooperating with said aperture to provide an effective exposure aperture of variable magnitude, means for limiting the movement of said diaphragm means responsively to said signals, means cooperating with said diaphragm means for controlling the positioning of said means for limiting said travel, and means for initiating movement of said diaphragm means and then initiating movement of said shutter blade.

3. The combination defined in claim 2 wherein said means for variably limiting said travel includes a resilient reversing member mounted for movement between a first position wherein said member intersects the path of travel of a portion of said blade for momentarily engaging and reversing the direction of movement of said blade and a second position wherein said member is out of the path of travel of said portion.

4. The combination as defined in claim 2 wherein said means for variably limiting said travel of said blade includes a plurality of resilient reversing members with which a portion of said blade may be momentarily engageable for reversing the direction of movement of said blade, at least one of said members being mounted in said path for defining the limit of travel of said blade, and at least another of said members being mounted at an intermediate position for movement between a first position wherein said other member is in an intersecting position relative to the path of said blade and a second position wherein said other member is out of the path of said blade.

5. In a shutter mechanism cooperating with a photoelectric means for producing electrical signals in accordance with the intensity of light incident thereon, in combination, housing means having an exposure aperture therein, a shutter element mounted for movement relative to said aperture for effecting exposures through said aperture and being characterized in that the time interval of an exposure afforded thereby is a function of the total travel of said element, means mounted for movement in and out of the path of travel of said element for variably limiting said travel, diaphragm means mounted for movement relative to said exposure aperture and cooperating with said aperture to provide an effective exposure aperture of variable magnitude, means responsive to said signals for controlling the movement of said diaphragm means, means cooperating with said diaphragm means for controlling the movement of said means for variably limiting said travel, and actuating means for initiating movement of said diaphragm means and then initiating movement of said shutter element.

6. The combination as defined in claim 5 wherein said means cooperating with said diaphragm means comprises a cam means mounted on said diaphragm means and a cam follower means which is engageable with and movable responsively to said cam means, said means for variably limiting said travel being mounted for cooperation with said cam follower means.

7. In a shutter mechanism cooperating with photoelectric means for producing electrical signals in accordance with the intensity of light incident thereon, in combination, housing means having an exposure aperture therein, a shutter element mounted on said housing means for movement relative to said exposure aperture for effecting exposures through said aperture and being characterized in that the time interval of an exposure afforded thereby is a function of the total travel of said element, resilient reversing means mounted for movement in and out of the path of travel of said element for variably limiting said travel, diaphragm means mounted for movement relative to said exposure aperture and for cooperating with said aperture to provide an effective exposure aperture of variable magnitude, said diaphragm means having a plurality of engagement portions thereon, means responsive to said electrical signals for engaging one of said engagement portions predeterminedly in accordance with the intensity of said signals, said diaphragm means including cam means, cam follower means engageable with and movable responsively to said cam means, said resilient reversing means being mounted for movement in and out of the path of said travel in accordance with the movement of said cam follower means, and actuating means for first moving said diaphragm means toward engagement of said one of said engagement portions and for then initiating movement of said shutter element to effect an exposure.

8. A shutter mechanism for automatically controlling exposures in accordance with electrical signals produced by a photoelectric means responsively to the intensity of light incident thereon, said shutter mechanism comprising, in combination, a housing means including an exposure aperture therein, a shutter blade normally mounted in covering relation to said aperture for substantially free movement between an aperture-covering position and an aperture-uncovering position for effecting exposures, said shutter blade being characterized in that the time interval of exposure afforded thereby is a function of the total travel of said blade, resilient reversing means for limiting the travel of said blade, at least one portion of said resilient means being mounted for movement in and out of the path of said travel, diaphragm means mounted for movement adjacent said exposure aperture and for cooperating with said aperture to provide an effective exposure aperture of variable magnitude, said diaphragm means having a plurality of engagement portions thereon, each of said portions being disposed upon said diaphragm means in a predetermined spatial relationship to an effective exposure aperture of predetermined magnitude, a stop means mounted for movement through a plurality of positions wherein said stop means is engageable with said engagement portions, means for moving said stop means to a position determined by and responsively to said electrical signals, whereby engagement of one of said engagement portions with said stop means establishes a predetermined effective exposure aperture, and actuating means for initiating movement of said diaphragm means toward engagement of a predetermined one of said engagement portions with said stop means and for then initiating said movement of said shutter blade.

9. A shutter mechanism as defined in claim 8 wherein said diaphragm means comprises a disk member having a plurality of openings of graded area arcuately spaced about said disk member, said disk member being so movable that each of said openings may be aligned with said exposure aperture.

10. A shutter mechanism as defined in claim 9 wherein said diaphragm member comprises a substantially planar disk mounted for rotation and said engagement portions are disposed substantially perpendicularly to one face of said disk.

11. A shutter mechanism as defined in claim 8 wherein said diaphragm means comprises at least two leaves having notched portions therein and so disposed for movement in adjacent, substantially parallel planes relative to one another that said notches cooperate to establish the magnitude of said effctive exposure aperture.

12. A shutter mechanism for automatically controlling exposures in accordance with electrical signals produced by photoelectric means responsively to the intensity of light incident thereon, said shutter mechanism comprising, in combination, a housing means including an exposure aperture therein, a shutter blade normally mounted in covering relation to said aperture for substantially free movement between an aperture-covering position and an aperture-uncovering position for effecting exposures, means for imparting an impact to said shutter blade for moving said shutter blade from said aperture-covering position, resilient reversing means for establishing limits of travel of said blade from said aperture-covering position and for reversing the direction of movement of said blade and returning said blade to said aperture-covering position, a diaphragm element mounted for rotation adjacent said exposure aperture and having a plurality of openings of different area arcuately spaced with respect to the pivotal axis of said element, said element being so rotatable that each of said openings may be aligned with said exposure aperture, said element having a plurality of engagement portions disposed thereon in predetermined relationship to each of said openings, stop means mounted for movement through a plurality of positions wherein said stop means is engageable with said engagement portions, means for so moving said stop means to a position determined by and responsively to said electrical signals that engagement of one of said engagement portions with said stop means aligns said exposure aperture with one of said openings corresponding to said one of said engagement portions, means for rotating said diaphragm element and for actuating said means for imparting an impact to said shutter blade in timed relationship to the rotation of said diaphragm element, and means for retaining said stop means in a releasably fixed position upon actuation of said diaphragm element.

13. A shutter mechanism for automatically controlling exposures in accordance with electrical signals produced by a photoelectric means responsively to the intensity of light incident thereon, said shutter mechanism comprising in combination, a housing means including an exposure aperture therein, a shutter blade normally mounted on said housing means in aperture-covering position for substantially free movement between said aperture-covering position and an aperture-uncovering position for effecting exposures, means for imparting an impact to said shutter blade for moving said blade from said aperture-covering position, resilient reversing means for establishing limits of travel of said blade from said aperture-covering position and for reversing the direction of movement of said blade and returning said blade to said aperture-covering position, said resilient reversing means including at least one reversing member mounted for movement in and out of the path of said travel, a diaphragm element mounted on said housing means adjacent said exposure aperture for pivotal movement, said diaphragm element having a plurality of openings of graded area arcuately spaced about said element with respect to the pivotal axis thereof, said element being so pivotable that each of said openings may be aligned with said exposure aperture, said element having a plurality of engagement portions disposed thereon in predetermined relationship to each of said openings, a stop means mounted for movement through a plurality of positions wherein said stop means is engageable with said engagement portions, means for so moving said stop means to a plurality of positions of engagement determined by and responsively to said electrical signals that engagement of one of said engagement portions with said stop means aligns said exposure aperture with one of said openings corresponding to said one of said engagement portions, cam means comprising a portion of said diaphragm element, cam follower means engageable with and movable responsively to said cam means, at least said one reversing member being mounted upon and movable with said cam follower means, and actuating means for initiating rotation of said diaphragm element and for imparting an impact to said shutter blade in timed relation to the rotation of said diaphragm element.

14. A shutter mechanism for automatically controlling exposures in accordance with electrical signals produced by a photoelectric means responsively to the intensity of light incident thereon, said shutter mechanism comprising, in combination, a housing including an exposure aperture therein, a substantially free-moving shutter blade normally mounted on said housing in covering position relative to said aperture and being movable between said covering position and an aperture-uncovering position for effecting exposures, a substantially planar diaphragm disk so rotatably mounted on said housing adjacent said exposure aperture that the plane of said disk is substantially perpendicular to the optic axis of said exposure aperture, said disk having a plurality of openings of different area therein, said openings being arcuately spaced about said disk adjacent the periphery thereof with respect to the pivotal axis of said disk, said disk being so rotatable that each of said openings may be aligned with said exposure aperture for establishing a plurality of effective exposure apertures, means for so rotating said disk that said openings are movable across said aperture in sequence, said means for rotating said disk including a spring means, a gear means for transmitting force exerted by said spring means to said disk, and link means for releasably retaining said gear means from transmitting said force, said diaphragm disk having a plurality of engagement portions disposed thereon in predetermined relation to each of said openings, stop means mounted for movement through a plurality of positions wherein said stop means is engageable with said engagement portions, means for so moving said stop means to a position determined by and responsively to said electrical signals that engagement of one of said engagement portions with said stop means aligns said exposure aperture with one of said openings corresponding to one of said engagement portions, and actuating means for so releasing said link means that said diaphragm disk rotates under the force exerted by said spring means until one of said engagement portions engages said stop means.

15. A shutter mechanism as defined in claim 14, including cam means comprising a portion of said diaphragm disk, cam follower means engageable with and movable responsively to said cam means, and resilient reversing means including at least one reversing member mounted upon and movable responsively with said cam follower means for so moving said reversing member in and out of the path of said travel that the exposure interval afforded by said shutter blade is controlled, and means for rotating said diaphragm disk and for imparting an impact to said shutter blade in timed relation to said rotation of said disk.

16. A shutter mechanism for automatically controlling exposures in accordance with electrical signals produced by photoelectric means responsively to the intensity of light incident thereon, said shutter mechanism comprising, in combination, a housing means including an exposure aperture therein, a shutter blade normally mounted in covering relation to said aperture for substantially free movement between an aperture-covering position and an aperture-uncovering position for effecting exposures, means for imparting an impact to said shutter blade for moving said shutter blade from said aperture-covering position, resilient reversing means for establishing limits of travel of said blade from said aperture-covering position and for reversing the direction of movement of said blade and returning said blade to said aperture-covering position, a diaphragm element mounted adjacent to and for cooperating with said exposure aperture to provide a plurality of effective exposure apertures, said diaphragm element including a plurality of diaphragm members mounted for movement between covering and uncovering positions relative to said exposure aperture for varying the size of said effective exposure aperture, at least one of said diaphragm members having a plurality of engagement portions disposed thereon in predetermined relationship to the size of said effective exposure aperture, stop means mounted for movement through a plurality of positions wherein said stop means is engageable with said engagement portions, means for so moving said stop means to a position determined by and responsively to said electrical signals that engagement of one of said engagement portions with said stop means provides an effective exposure aperture of predetermined size corresponding to said one of said engagement portions, and means for moving said members of said diaphragm element and for actuating said means for imparting an impact to said shutter blade in timed relation to the movement of said members of said diaphragm element.

17. A shutter mechanism as defined in claim 16, wherein said diaphragm members include at least two substantially planar leaves disposed for movement oppositely to one another in substantially parallel adjacent planes across said exposure aperture.

18. A shutter mechanism for automatically controlling exposures in accordance with electrical signals produced by photoelectric means responsively to the intensity of light incident thereon, said shutter mechanism comprising, in combination, housing means including an exposure aperture therein, a substantially free-moving shutter blade normally mounted in aperture-covering position and movable between said aperture-covering position and an aperture-uncovering position for effecting exposures, means for imparting an impact to said shutter blade for moving said shutter blade from said aperture-covering position, resilient reversing means for establishing limits of travel of said blade from said aperture-covering position and for reversing the direction of movement of said blade and returning said blade to said aperture-covering position, a diaphragm element mounted adjacent to said exposure aperture for cooperating with said exposure aperture to provide an effective exposure aperture, said diaphragm element including a plurality of leaves disposed for movement between aperture-covering and aperture-uncovering positions for varying the magnitude of said effective exposure aperture, at least one of said leaves having a plurality of engagement portions disposed thereon in predetermined relation to an effective exposure aperture of predetermined magnitude, stop means mounted for movement through a plurality of positions wherein said stop means is engageable with said engagement portions, means for so moving said stop means to a position determined by and responsively to said electrical signals that engagement of one of said engagement portions with said stop means provides an effective exposure aperture of predetermined magnitude corresponding to said one of said engagement portions, cam means comprising a portion of at least one of said leaves, cam follower means engageable with and movable responsively to said cam means, said resilient reversing means including at least one reversing member mounted upon and movable with said cam follower means for movement in and out of the path of travel of said blade, and actuating means for moving said leaves and for actuating said means for imparting an impact to said shutter blade in timed relationship to the movement of said leaves.

19. A shutter mechanism as defined in claim 18, wherein said means for moving said stop means comprises a galvanometer having a moving coil and an elongated portion extending from and substantially in the plane of movement of said coil, said stop means being mounted adjacent that extremity of said elongated member opposite to said coil, said shutter mechanism including means for retaining said stop means in a releasably fixed position upon actuation of said diaphragm element.

References Cited in the file of this patent

UNITED STATES PATENTS

| | | |
|---|---|---|
| 2,662,457 | Fairbank | Dec. 15, 1953 |
| 2,752,834 | Fairbank | July 3, 1956 |
| 2,868,095 | Gebele | Jan. 13, 1959 |
| 2,877,697 | Whittier | Mar. 17, 1959 |
| 2,878,736 | Wareham | Mar. 24, 1959 |
| 2,887,025 | Rentschler et al. | May 19, 1959 |
| 2,900,886 | Gebele | Aug. 25, 1959 |
| 2,911,897 | Fahl | Nov. 10, 1959 |